Jan. 19, 1971  W. M. AYERS  3,555,881
NON-DESTRUCTIVE TESTING METHOD
Filed June 11, 1969  5 Sheets-Sheet 1

INVENTOR.
William M. Ayers
BY Bruce M. Kanuch
ATTORNEY

INVENTOR.
William M. Ayers

United States Patent Office 3,555,881
Patented Jan. 19, 1971

3,555,881
NON-DESTRUCTIVE TESTING METHOD
William M. Ayers, Tulsa, Okla., assignor to The Dow Chemical Company, Midland, Mich., a corporation of Delaware
Filed June 11, 1969, Ser. No. 832,090
Int. Cl. G01n 3/00; G01m 5/00
U.S. Cl. 73—37                                                      9 Claims

ABSTRACT OF THE DISCLOSURE

A method for testing pressure vessels by the "direct expansion" method is provided. In this method a graphic record of pressure and volume is made during the introduction of the pressurizing fluid. The rise in pressure is a function of the volume of fluid introduced. In turn, the stress to strain relationship of vessel material is proportional respectively to the pressure and volume injected up to the elastic limit. The introduction of the fluid is terminated temporarily before the proportional (linear elastic) limit of the material comprising the vessel is reached. A reference line is then drawn on the graph parallel to the linear portion of the previous graphic record extending beyond the temporary termination point, and offset a distance calculable to the permissible permanent expansion specified for the test. Subsequently, the introduction of the fluid is started again and the test terminated when the graphic plot of pressure versus volume intersects the reference line or when intersection appears imminent. According to this method, the vessel testing is non-destructive and safer.

BACKGROUND OF THE INVENTION

In the hydrostatic testing of pressure vessels a pressurizing hydraulic fluid is pumped, under pressure, into a fluid-filled test vessel. As an increasing quantity of fluid is pumped into said vessel the internal pressure of said vessel rises. The quantity of fluid pumped into the vessel is essentially linearly proportional to the internal pressure in said vessel until the proportional limit of the vessel has been reached. Beyond this proportional limit the quantity of fluid pumped and internal pressure are no longer linearly proportional to one another. This readily can be seen, for example, from a recording of the internal pressure versus quantity of fluid introduced into a fluid-filled vessel undergoing a test wherein a straight line is produced prior to the vessel reaching its linear elastic limit. Beyond this elastic limit, the line deviates in slope. Accordingly, to the extent that the proportional limit and elastic limit are synonymous, above this deflection point the vessel will demonstrate a permanent set from expansion.

Ordinarily pressure versus volume, or pressure versus time (if a constant volume, i.e. a positive displacement delivery pump is used), is plotted by a recorder in a non-destructive hydrostatic pressure test and the test is terminated at the point where the line deviates in slope, i.e. at the proportional limit of the vessel undergoing the test. However, governmental standards and customer requests sometimes require that certain preselected conditions must be employed in testing vessels so that a test only to the proportional limit is not acceptable.

For example, in the hydrostatic testing of pressure vessels, e.g. compressed gas cylinders, certain standards have been set up by governmental organizations such as the Department of Transportation, D.O.T., formerly the Interstate Commerce Commission, and technical societies such as the Compressed Gas Association (CGA). One of the methods approved by the above authorities comprises the "direct expansion" method. In this method a measurable weight (volume) of water is forced into a cylinder which has initially been substantially completely filled with a known weight of water at a known temperature. The internal pressure in the vessel is raised to a preset test pressure. This weight (volume) of water introduced is measured at the *completion* of the test. When it is expelled from the cylinder by releasing the pressure. The permanent and total volumetric expansion of the cylinder is calculated by subtracting the weight (volume) of water expelled from the weight (volume) of water forced into the cylinder. The compressibility of the water is taken into consideration. Under the D.O.T. compressed gas cylinder specifications, any permanent expansion of the test vessel must be less than 10 percent of the total expansion at the specified test pressure for the vessel to be considered safe for further use. The specified test pressure for vessels is usually a factor such as 1½ or 1⅔ times the working (use) pressure, though upon occasion a more direct relation to yield strength or ultimate strength of the material is preferred. A specific discussion of the direct expansion method is found at pages 263–268 of the Handbook of Compressed Gases published by Compressed Gas Association, 1966.

However, there are certain disadvantages associated with the direct expansion method. The most important being that the test is not necessarily non-destructive. That is the condition of the vessel undergoing the test is not determined until after it has been pressurized to the preset test pressure, and the pressure has been released. If more than a permissible amount of permanent expansion has been effected to the vessel it must be willfully scraped, by cutting it open with a torch for instance, to prevent further use. Likewise, there is always the danger of a complete and unexpected rupture of the vessel when subjected to a preset test pressure which has usually been indirectly selected based on specifications derived from tests made on vessels other than the one being tested, or on specimens of materials similar but not ordinarily identical to the "heat of steel" or other substance from which the vessel is constructed.

The present method concerns a non-destructive method of testing vessels according to specifications set up under the direct expansion method. In the present method the condition of a vessel is individually and intimately known at each instant during the test, and the introduction of the test fluid is terminated if the permissible permanent expansion is going to be effected to the vessel prior to the reaching of the preset test pressure. In this manner if the vessel exhibits a specified permanent expansion at a pressure below the preset test pressure the vessel is not destroyed and can be downgraded and requalified (and re-marked accordingly) for use at a lower working pressure. The likelihood of complete destruction due to a rupture of the vessel is minimized because the instantaneous graphic recording imparts immediate control to this procedure.

SUMMARY OF THE INVENTION

In the present method a X–Y recorder, or other similar automatic recording device, is employed to plot, while introducing a test fluid into a cylinder, the relation of the pressure versus the volume of fluid introduced; for example, the ordinate represents pressure while the abscissa represents volume of fluid which is introduced. During the pressurizing of a test vessel a line is drawn on the graph which is substantially linear during the elastic expansion of the vessel undergoing the test. At the first indication of a departure from linearity in the pressure-volume plot, i.e. at about the proportional limit of the vessel, the introduction of the test fluid is stopped. On the graph the linear portion of the pressure-volume curve is projected upwardly to the ordinate equal to the preset test pressure. The corresponding abscissa represents the volume of test fluid which would have been introduced into the vessel to pressurize to the test pressure if the vessel would have continued its elastic expansion. From this total volume is subtracted the volume of fluid insroduced due to the compressibility of the fluid, at the test pressure and temperature of the test fluid, and the volume of fluid which corresponds to the expansion of the connecting means between the pressurizing and the vessel. The value remaining is equal in terms of the measured quantity of fluid to the actual total expansion of the vessel itself, at the test pressure if the vessel would have continued to expand elastically. In the direct expansion method it is specified that a maximum part of this total expansion may result from permanent nonelastic expansion of the vessel. The maximum (permissible) permanent expansion is then determined from the total expansion (volume) as set forth hereinbefore, i.e. for example according to the Compressed Gas Association, only 10% of total expansion may at test pressure be due to permanent expansion. The volume equal to this permissible permanent expansion is calculable at zero pressure and can be plotted on the abscissa as an offset point through which a reference line parallel to the linear portion of the pressure volume curve is drawn corresponding to the permissible permanent set. The introduction of the test fluid into the vessel is then again started and when the pressure-volume curve intersects or appears to be certain of intersecting the permissible permanent expansion reference line, the test is terminated thus preventing a destruction of the vessel. Of course if the predetermined test pressure is reached before the specified percent permanent expansion to the vessel, the testing is stopped and the vessel ascertained to be safe.

Where there is an amount of entrapped gas in the vessel a portion of the fluid volume increase goes to compress the gas, e.g. air, present in the vessel. This is shown on the pressure versus volume plot as a non-linear progression of the PV curve at the start of the test, known in the art as a "foot." As indicated, when the foot appears it means that portion of the recorded volume-pressure response from the test fluid introduced is not entirely due to the expansion of the vessel but instead is due to the compressing of this entrapped gas. Graphically recording the foot means it can be taken into consideration and given a numerical value. The actual volume measurements on the abscissa are prorated to scale so as to accurately determine the actual volume expansion of the vessel. This can be done by extending the linear portion of the PV curve down to the abscissa, Point F of FIG. 2. The distance from the origin to the intercept of this line with the abscissa is equal to the volume of air compressed. The actual amount of liquid introduced which results in an expansion of the vessel and compressing of the fluid at any pressure during the test is equal to the abscissa value at the pressure involved minus the volume of gas entrapped. That is, for any volume along the origin the actual volume of liquid introduced is equal to the abscissa value minus the volume of gas compressed. This value is used to prorate volumes employed in the previous discussion for determining the actual expansion of the vessel and to plot the percentage permanent expansion line as hereinbefore defined.

As a preliminary step in the present method the expansion and compressibility of test fluid in the hose or connecting lines from the pressurizing pump to the test vessel must be determined at the predetermined test pressure to be employed. It is usually preferred to conduct a hydrostatic test on this line to this predetermined pressure and plot it on a X-Y recording similar to the actual testing of a pressure vessel. The amount of expansion of this hose, and fluid compressibility noted as $\Delta Vh$ in the drawings, is later subtracted from the calculations for total expansion of the test vessel which is being subjected to a non-destructive test.

DETAILED DESCRIPTION OF THE INVENTION

Figure 6:
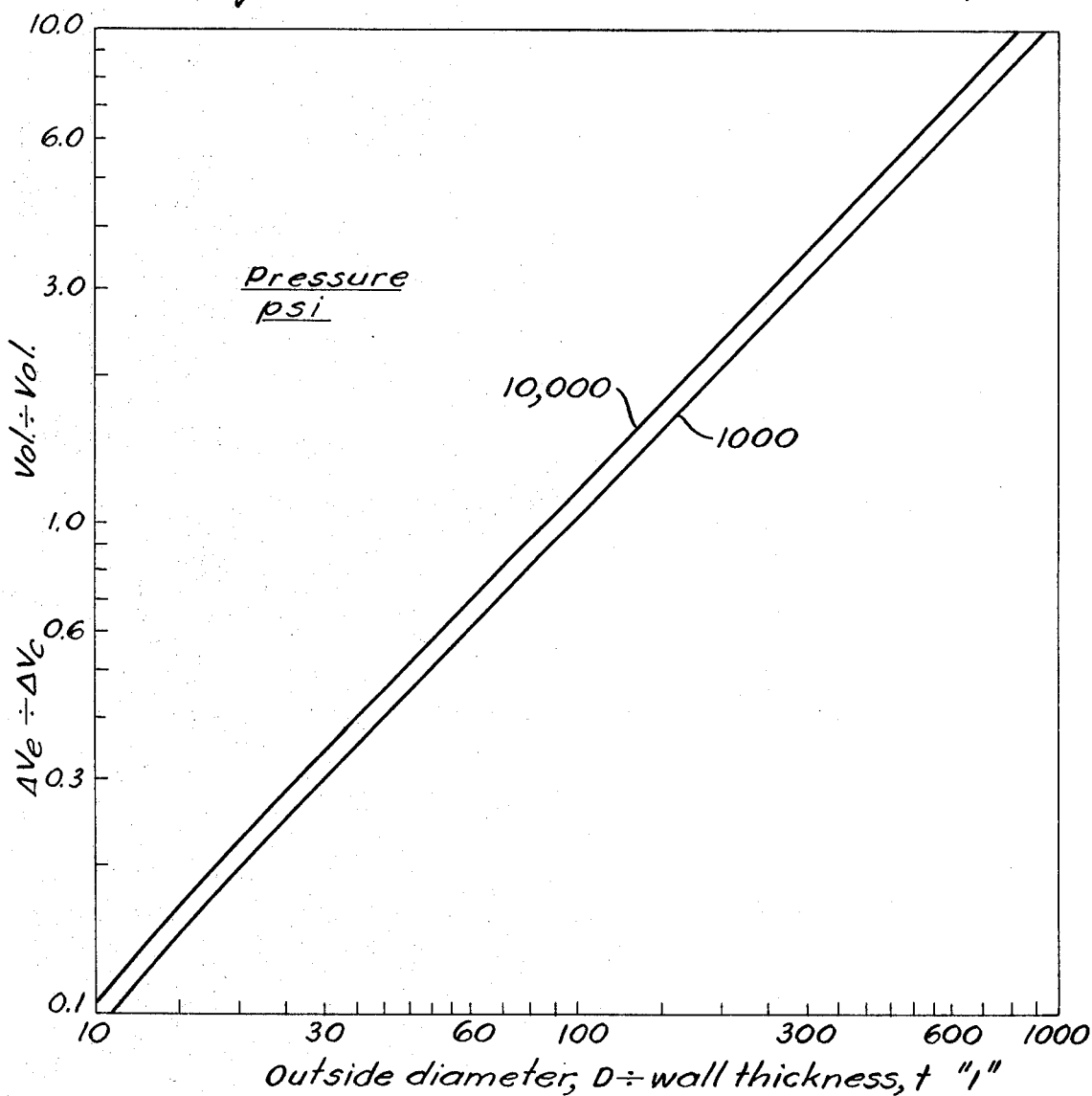
FIG. 6 represents one graph means of prorating leakage in a test system to fluid compressibility (water) and vessel expansion.

The volume of test fluid, e.g. water, forced into the test vessel due to the compressibility of water and not due to the expansion of the test vessel at a certain pressure and temperature can be determined by reference to standard compressibility factor curves such as that shown at page 267, FIG. 6, of the Handbook supra. The volume of water forced into the cylinder due to the compression thereof must be ascertained in order that the actual expansion of a test vessel at test pressures can be determined.

Figure 1:
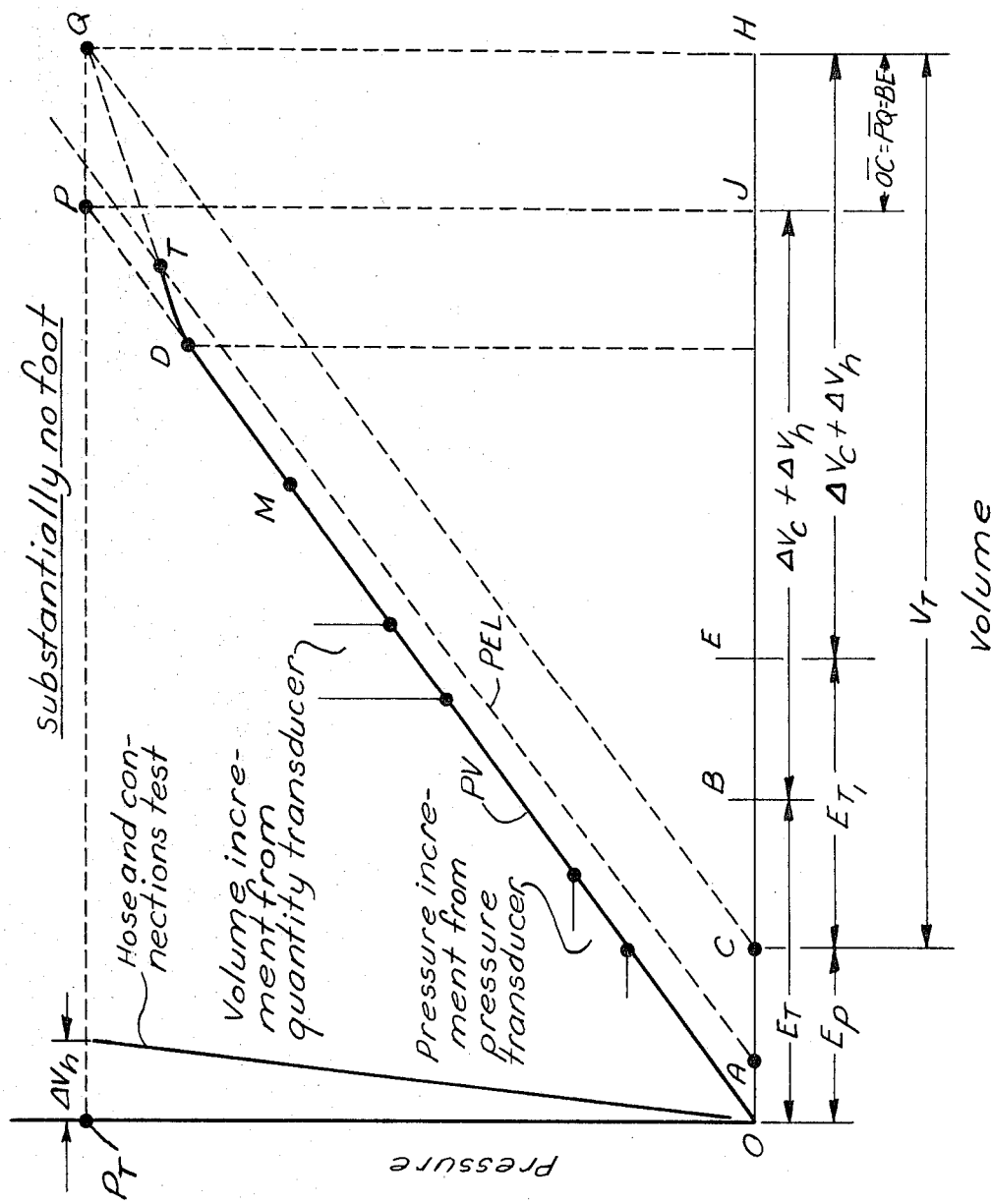
FIGS. 1-4 represent graphic records of hypothetical tests of a pressure vessel by the method of the present invention.

In the following detailed description of one embodiment of the present invention reference is made to FIG. 1, where it is illustrated that substantially all air (gas) has been removed from the test vessel prior to being pressurized so that the compressibility of the gas in the vessel can be ignored. This is shown in FIG. 1, by the fact that the pressure-volume curve has no foot. Without the X-Y recording, less accurate values for comparing water input and output, before and after testing according to the CGA, may result because of the problem of complete air removal.

In this embodiment assume that a vessel, for example under CGA (DOT) standards, is required to be tested to a test pressure $P_T$. At this pressure $P_T$ the permanent expansion $E_p$ (eventually to become distance O-A, FIG. 1) imparted to the vessel must be less than X percent of the total expansion $E_T$ (distance O-B or C-E, FIG. 1) in order for the vessel not to be cause for rejection, i.e. at pressure $P_T$, $E_p/E_T \times 100$ must be less than or equal to X percent. This is known and accepted in the trade as the direct expansion method of hydrostatically testing compressed gas cylinders.

In testing a vessel by the present improved method the expansion of the line or hose connecting the pressurizing pump and test vessel is first determined at test pressure $P_T$. This is noted in FIG. 1 as $\Delta Vh$. Any relatively significant value $\Delta Vh$ will be employed later in the process as a correction for determining the actual total expansion $E_T$ of the test vessel.

A fluid filled vessel to be tested is then connected to a testing apparatus (schematically shown in FIG. 5) and the internal pressure of the vessel increased by pumping the test fluid into the vessel. A pressure-volume curve PV is produced on a recorder, e.g. X-Y recorder. At the first point D where the PV line deviates from linearity the introduction of the liquid is stopped. This point D represents the linear elastic or proportional limit of the vessel. The linear portion of the PV line is extended, e.g. by pencil construction to the ordinate value P equal to $P_T$ whose actual value is best obtained by proration of recorded volume increments from the quantity transducer while the linear curve is being traced. This represents a PV curve of the vessel if it had expanded elastically to the test pressure $P_T$. The total volume $V_T$ of the test liquid at this test pressure $P_T$ is calculated and noted on the abscissa, distance OJ or CH representing the volume of fluid necessary to raise the internal pressure on the vessel to $P_T$ if it had continued to expand elastically. The total expansion of the vessel $E_T$ at $P_T$ is then determined; this being equal to the total volume of fluid $V_T$ minus the sum of the volume of fluid compressed at pressure $P_T$ (as determined from a standard reference graph) $\Delta V_c$, and the expansion of the hose, $\Delta Vh$. That is $E_T = \Delta V_T - (\Delta V_c + \Delta Vh)$. There are published and unpublished formulae in use for numerically calculating elastic strain directly which could be used to scale $E_T$. When this is commercially acceptable, so determining $E_T$ can be properly substituted in the stepwise procedures herein outlined, or if not actually made a part of the more preferred graphic means of obtaining $E_T$, such formulae may be used for verification or checking. Also, should it be preferred to obtain $E_T$ by auxiliary instrumentation such as by strain gage, strainometer, etc., readings. This procedure can also be made a part of stepwise procedure or verification or complementary control over the test.

It is not mandatory that the test progress to the limit D, but a considerable linear trace should be established. Rather the same resulting value of P could be calculated if testing were temporarily suspended for a volume reference at M. In fact, according to specifications that state $P_T$ must be increased, say 100 p.s.i., if testing progresses beyond some percentage of $P_T$, 80%, should some misfortune such as a leak occur, then stopping at a predesignated value of M can be desirable. Nevertheless, relatively few vessels fail, so waiting to detect some deflection at a point D is usually expedient.

The permissible permanent expansion $E_p$ allowed for this vessel, which was said to be X, percent, or $E_p/E_T \times 100$, must be equal to or less than X, where X is specified. The amount (volume) of permissible permanent expansion can be calculated. But calculation only becomes obvious after congruent geometric triangles OPJ and CQH are imagined to exist, whereas the slope of the hypotenuse OD, or OP by extention and CQ represents real and individual data characteristics of the vessel. Altitudes PJ and HQ are equal, as are the legs OJ and CH. Likewise segments of the legs BJ and EH are equal, so that segments of this same leg OB and CE (equal to $E_T$ and $E_{T1}$ designated) are also equal. Also $OC=BE=JH=PQ$. From this FIG. 1 OE is equal to OC plus CE, or it can be seen from geometry that OE is also equal to OC plus OB since CE and OB are equivalent. Now by way of calculation it is possible to locate a point A equal to OA such that OA will represent X percent of $E_T$. When this is done, the length OC will become congruent with OA, so now the parallel reference line PEL can be constructed through A and no longer imagined to be through C. If X is known as 10 percent, then by formulation, $$OC \div (OC+CB) = \frac{1}{10}$$

or in this example X is equal to $\frac{1}{9}$ $E_T$ since $E_T=OB$. This simple equation is very practical. Definitely the use of an X-Y recorder facilitates this procedure. This line PEL serves as a reference so that the condition of the vessel in respect to the allowable permanent expansion can be readily determined during the test by reference to the relation of the progress of the PV line to the PEL line.

After these necessary calculations and graphic constructions, the test fluid is then again introduced and continued until the PV line intersects or is intimate of intersection with the permanent expansion reference line PEL. The test is stopped at the point T, thus allowing a non-destructive testing of the vessel. If the vessel, assuming that the vessel is in a weakened condition, were tested up to the termination pressure $P_T$ it is apparent that much more than X percent permanent expansion (a volume included in the segment A-C, FIG. 1) would have been effected to the vessel.

Figure 2:
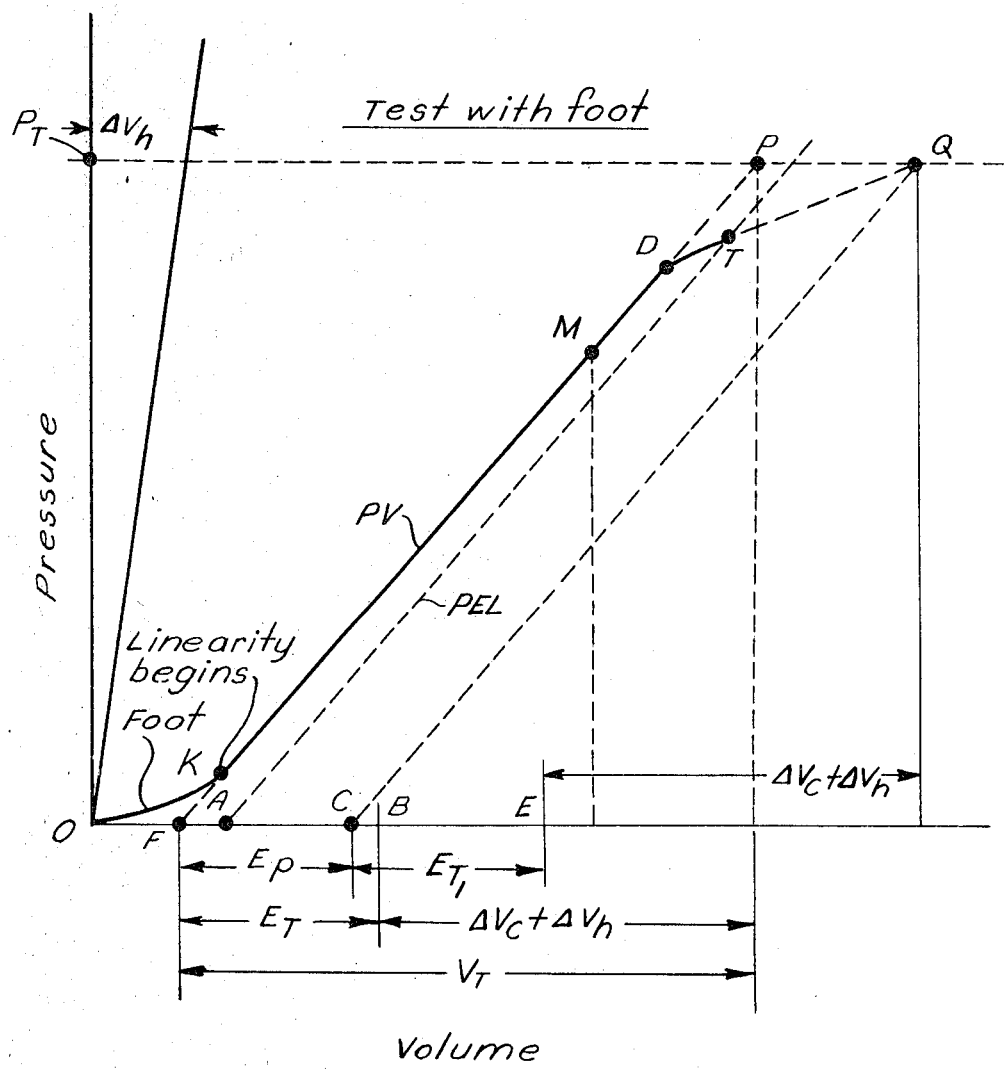

If a foot appears in the PV curve (FIG. 2) then the actual volume of liquid introduced must be prorated to represent the amount of liquid actually going to expand the vessel and compress itself. Numerically any volume on the abscissa is reduced by an amount OF which represents the volume of liquid going to compress the entrapped gas. The test is run substantially the same as previously discussed except that the volume values must be reduced by OF where again OF is equal to the volume of gas compressed (FIG. 2) and is obtainable as an extension KF of the linear portion of the PV curve. Thus in this test $V_T$, or the total volume injected after first filling the vessel, is reduced by a factor of OF and $E_T$ and $E_p$ are calculated as described hereinbefore based on a new origin F (FIG. 2).

Figure 3:
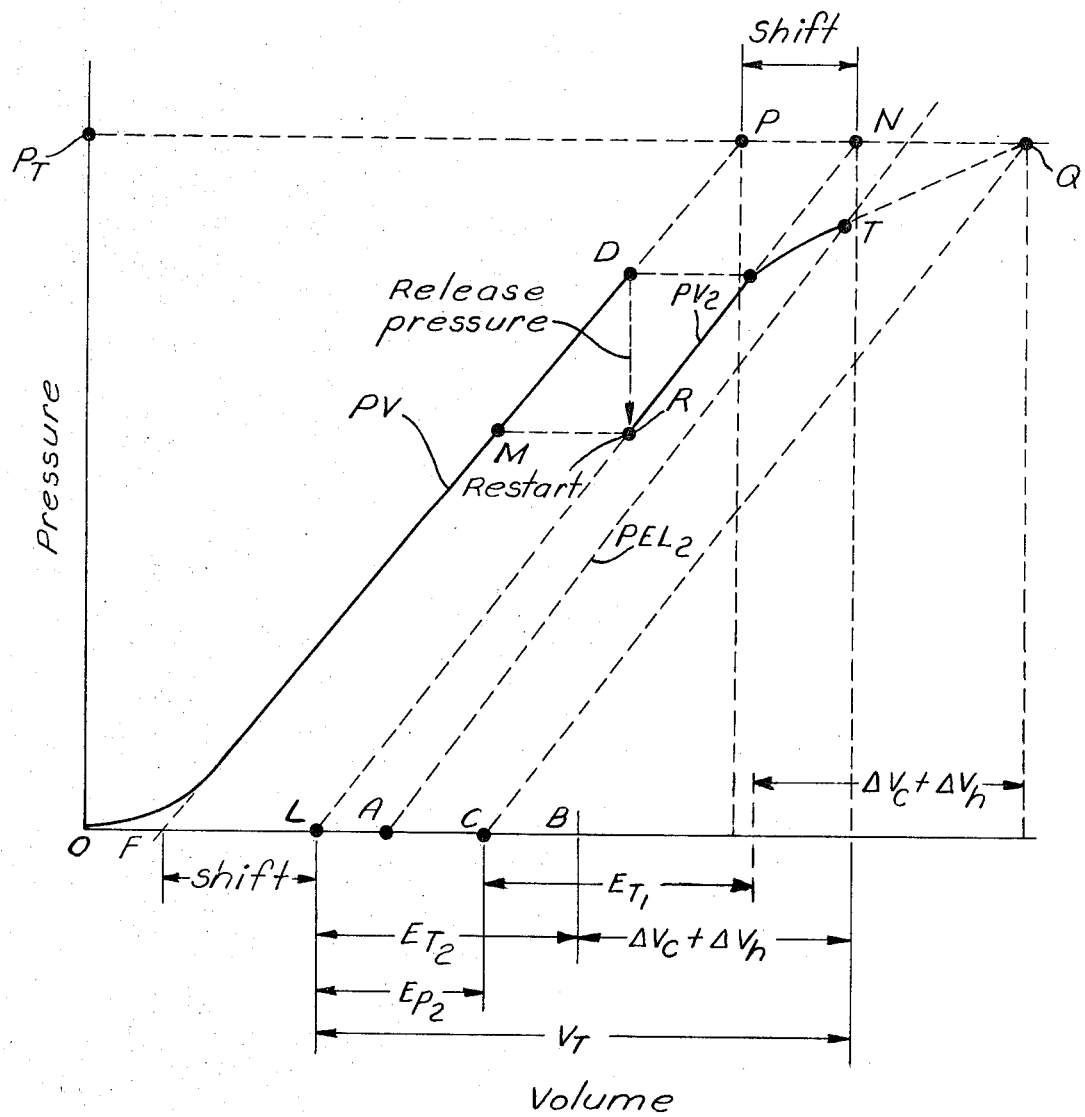

In both of these previous tests it was stated that the test is stopped at a point D, or reference pont D, the point where the PV line first deflects from linearity, and then continued after the PEL line has been drawn. This is often the case, but in a preferred embodiment after the termination of the test at point D, the record of the PV line is shifted. The pressure in the vessel is released to some convenient pressure R (FIG. 3) so that the original PV line will not be affected by any variations due in starting the test up again. Hence it will remain as the desired permanent record, undisturbed. All calculations are made as previously described except that they are transformed to a new origin L based on an extension of the linear portion of the shifted curve $PV_2$. L and consequently R can be selected to make scaling calculations the easiest. This embodiment can be clearly illustrated by reference to FIG. 3. When the test is stopped at pressure D the PV line is shifted to draw a new $PV_2$ line by adjusting the recorder, e.g. shifting the pen etc., so that $PV_2$ will be drawn in part parallel to PV. The linear portion of $PV_2$ when the test is restarted is parallel to the linear portion of PV. A new N and origin L are marked on the graph along with the previous graphical constructions. The necessary calculations (including adjustments for the foot if any) are then based on the test pressure, total volume, total expansion, permanent expansion, which are noted in FIG. 3 as N, $V_{T2}$, $E_{T2}$, $E_{p2}$ and $PEL_2$ which are determined as previously set forth herein. By shifting the PV line in this manner the original PV line is not affected by any jiggling or shifting of the recorder pen, repositioning paper, etc. when the vessel is repressurized after determining the $PEL_2$ reference line.

In a further embodiment the original graph paper is removed from the recorder after the introduction of the test liquid has been terminated at point D or M (see figures), and a new graph paper is put in. The scales for the new chart are expanded by recalibrating the X-Y recorder to show the remainder of the test from pont D (or lesser pressure M) on PV to the final termination pressure PT, or T. By expanding the scales even greater accuracy of testing can be achieved since the intimacy of the PV curve to the PEL reference line now represents more distance per percent X.

Figure 4:
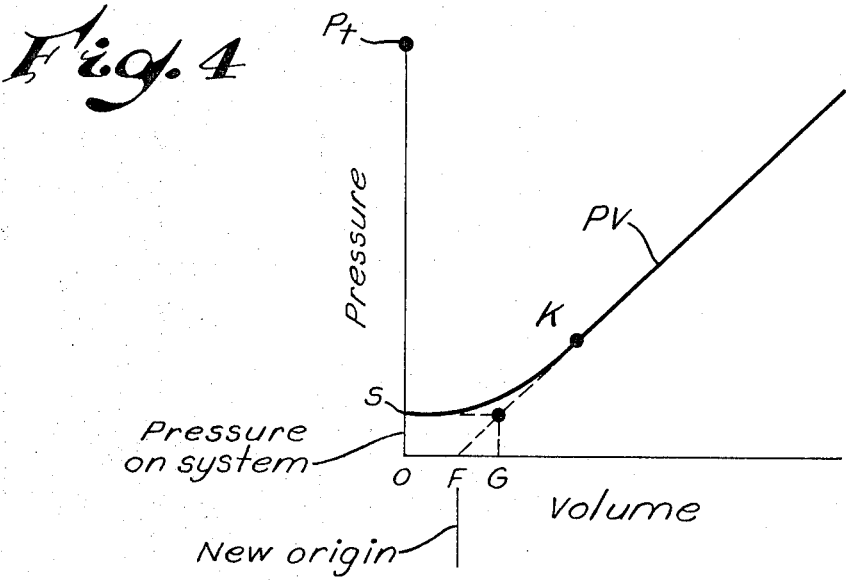

If the test fluid (FIG. 5) is derived from a fluid outlet supply under pressure, e.g. from a water main, there will be a certain pressure on the system even before the pressurizing pump is started. This is called suction or line pressure and will be represented on a recorder in an actual test by a distance OS, FIG. 4. If this pressure is a significant amount of the termination pressure $P_T$, then numerically the foot intercept F used to obtain the proper value of $V_T$ should be calculated by including FG obtainable by proration of a known volume increment provided by the quantity transducer. The point G is the projection onto the abscissa where the extension of the linear portion of the PV line intersects the ordinate whose value is the suction pressure, i.e. in the previous graphs instead of immediately employing the volume value F the value G (FIG. 4) should first be employed to calculate the amount of entrapped air, then the prorated distance F-G is added to $V_T$. This will assure more accurate results since the volume of liquid introduced has started at a point where some pressure OS was already on the system. Essentially this amounts to shifting the abscissa down from point S to point O, FIG. 4, thus standardizing all these embodiments to the same coordinate axes.

Figure 5:
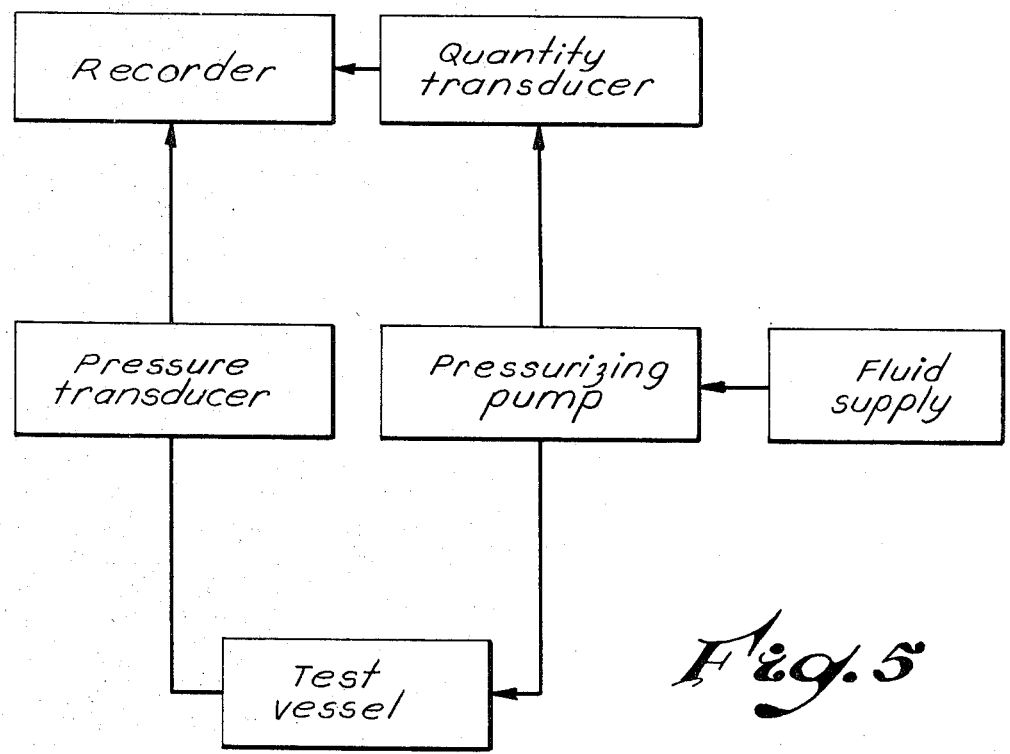
FIG. 5 represents schematically an apparatus which may be employed in the present method.

FIG. 5 shows schematically one embodiment of a pressure vessel testing apparatus used in the method of the instant invention with a pressure vessel attached thereto.

Ordinarily, a pressurizing pump which is used in the method of the instant invention will be of the positive displacement constant delivery at fixed r.p.m. type for ease in recording the test data; however, other types of pumps may also be employed as long as they implement accurate data and favorable operating characteristics.

When using a positive displacement pump, pumping time which is directly proportional to volume of liquid pumped at constant revolution, strokes, etc. per minute can be recorded in lieu of volume of liquid pumped.

Pumps not giving constant volumes can be also employed and used in the system since an autographic (X–Y) recorder is employed. In the latter case, by passing the liquid through a flowmeter, measuring suction flow by calibrating the fluid supply reservoir, or other like quantity transducer (sensors), the volume readily is translated into an electrical voltage which in turn is used to drive one of the coordinates of the recording chart.

In any event, the pump should ordinarily have a pressure capacity capable of developing stresses to exceed the elastic limit of the materials of construction of the vessel to be tested.

Leaks in connections and components not to be tolerated but rarely, and then only if their rate is extremely small and relatively insignificant. However, it has been found in practice that a temporary connection in the test system leaks, and practicality prevents removing the test fluid or otherwise taking corrective measure. In this instance a numerical ratio of $\Delta V_c \div E_T$ can be used to prorate leakage proportionately to water compressibility and vessel expansion. $E_T$ is obtained by auxiliary instrumentation or formulation if the vessel is geometrically shaped. This is possible because $\Delta V_c + E_T = V_T$, corrected as required for air, $\Delta V h$, etc. FIG. 6 shows a typical chart for this purpose.

The detection of internal pressure in said vessel during the pressurizing period can be realized by use of a pressure transducer. The term "transducer," as used herein, means a device or sensor activated by energy from one system and supplying another more usable form of energy to a second system. In operation, the pressure transducer receives hydraulic pressure from the vessel, converts it into electrical voltage and in turn transmits the voltage to the recorder. The pressure transducer can be made up of a combination of a pressure detecting means and a pressure analyzing means.

Pressure detecting means which can be utilized in the pressure transducer can be selected from a wide variety of such detectors including, for example, Bourdon-tube pressure gages, dead-weight piston gages, manganin wire-pressure indicators, strain gages, piezoelectric crystals, differential transformers and manometers.

Useful pressure analyzers which can be employed are those which can translate and convert the impulse received from a given pressure detector into electrical, magnetic, mechanical or other optical equivalent thereof for further transmission to the recorder. Potentiometers with driving voltage, Wheatstone-bridges, differential transformers and amplified photovoltaic devices are examples of particularly useful pressure analyzers.

Recorders used in the method of the instant invention can be, for example, conventional single or multipoint autographic line recorders, memory type oscilloscopes with attached camera or other photographic recording means and magnetic recorders. The selection of a given recorder for use in a specific embodiment of the instant apparatus will be governed by the type of pressure transducer system used in the pressure testing method.

Typical useful pressure transducer and recorder assemblies are, for example, (1) a Bourdon-tube pressure gage, microtorque potentiometer with driving voltage and a Varian (0–10 mv.) recorder; (2) a wire strain gage, Wheatstone-bridge and Wheelco standard line recorder; (3) a piezoelectric crystal, with amplifier, and a Leeds and Northrup single point recorder; (4) differential transformer and Brown recorder; (5) manometer, photovoltaic cell for following manometer fluid movement with change in pressure amplifier and a Texas Instrument line recorder; (6) strain gage, Wheatstone-bridge, amplifier and magnetic recorder; (7) manometer, with metallic fluid or having a piece of metal placed on top of a nonmetallic fluid, the manometer being centered within a coil (thus making a differential transformer assembly) and an autographic (X–Y) recorder; and (8) Bourdon-tube pressure gage, differential transformer and a slow-acting memory type oscilloscope with attached camera.

The hydrostatic fluid utilized in the instant method can be any of a wide variety of fluids including, for example, water, silicone oils, petroleum distillates, mineral oils, synthetic high pressure lubricants, chlorinated hydrocarbons, fluorochloro-substituted hydrocarbons, low-boiling hydrocarbons, acids, basis salts, glycols and the like liquid materials. Molten metals may be used upon occasion.

Ordinarily, substantially incompressible liquids will be used as the hydrostatic test media as these provide the optimum degree of sensitivity to pressure changes within the test vessel. However, fluids of known compressibility, gases for example, can be used in the instant apparatus and method although when using these, the sensitivity of the test may be affected. Gases as hydrostatic fluid, are particularly useful for testing long strings of pipe and other vessels wherein liquid test fluids may be difficult to obtain and/or expansive to remove completely from the vessel after testing. Water is a preferred fluid because of its availability and known compressibility.

The following examples will facilitate a more complete understanding of the present invention.

EXAMPLE 1

In this first example reference will be made to FIG. 1 since corrections for entrapped gas were not necessary. In this example an oxygen bottle had a specified test pressure of 5400 p.s.i. and permissible permanent expansion of this pressure of 10 percent of total expansion. The bottle was filled with water and connected to a testing apparatus similar to the schematically illustrated drawing in FIG. 5, having a X–Y recorder. The water was pumped into the vessel and the X–Y recorded the rise in pressure versus volume of water introduced. The line progressed linearly to a pressure of about 4275 p.s.i. where it started to deflect. The introduction of water was stopped and the chart removed from the recorder. The linear portion of the line on the chart was projected to the ordinate value of 5400 p.s.i. The total volume of water $V_T$ at this pressure was determined to be 0.352 gallon. From these values the reference line PEL for 10 percent permanent expansion was calculated (as previously described herein) to have an abscissa value of 0.00875 gallon. A reference line was drawn parallel to the PV line a distance therefrom representing 0.00875 gallon. The chart was placed back in the recorder and the introduction of water restarted. In this instance the PV line intercepted the ordinate value corresponding to the test pressure of 5400 p.s.i. before the reference line and so the test was stopped there. The actual permanent expansion of the vessel at the test pressure was determined to be 4 percent of total expansion.

In the previous test if the PV line had intersected the PEL reference line prior to the $P_T$ ordinate value the test would be stopped. The vessel is then downgraded for use at a lower working pressure based upon the data derived from the present method.

What is claimed is:

1. In the method of testing pressure vessels which exhibit elastic deformation on being subjected to the distending action of a pressurizing hydraulic fluid, wherein preset specifications require the determination of the amount of permanent expansion imparted to the vessel at a predetermined test pressure, including the steps of introducing the pressurizing fluid into said vessel while monitoring the quantity of fluid introduced thereby increasing the internal pressure within said vessel to said predetermined test pressure, and determining the amount of permanent expansion, if any, imparted to the vessel at the predetermined test pressure the improvement which comprises:

(a) substantially instantaneously plotting a line graphically as a record of the rise in pressure inside the vessel as a function of the volume of fluid introduced into the vessel in which during the introduction of said fluid into the vessel the line graph is substantially linear while said vessel is expanding elastically;

(b) substantially instantaneously discontinuing the introduction of said liquid at the occurrence of whichever is the first event of, the line intersecting a coordinate value on said graph corresponding to said predetermined test pressure, and the slope of the line deviating from a linear progression;

(c) when the event is the line deviating from linear progression extending the linear portion of said line graphic record to a coordinate value corresponding to said predetermined test pressure;

(d) determining the total amount of fluid required to be introduced into said vessel to provide said predetermined test pressure;

(e) plotting a reference line parallel to the linear portion of said graphic recording a distance therefrom equal to an amount of said total expansion equal to a predetermined amount of permissible permanent expansion of said vessel at said test pressure;

(f) introducing an addition amount of test fluid into said vessel to increase the pressure in the vessel above that when the introduction of liquid was terminated first temporarily while continuing the line graphic record;

(g) discontinuing the introducing of said fluid when said line being recorded intersects whichever is first of a coordinate value equal to said predetermined test pressure and said graphically constructed reference line;

(h) releasing said fluid from said vessel.

2. The method as defined in claim 1 wherein substantially all entrapped gas is removed from said test vessel before the test fluid is introduced.

3. The process as defined in claim 1 wherein the test fluid is a substantially incompressible liquid.

4. The method as defined in claim 1 wherein the test fluid is water.

5. The method as defined in claim 1 wherein the maximum amount of the permissible permanent expansion is about 10 percent of the total expansion of said vessel at the predetermined test pressure.

6. In a method for non-destructive testing of pressure vessels which exhibit elastic deformation on being subjected to the distending action of a substantially incompressible fluid, including the steps of introducing a substantially incompressible fluid into the interior of a fluid-filled vessel thereby increasing the internal pressure within said vessel above the ambient presure on said vessel and monitoring the increase of the pressure within said vessel as a function of the quantity of fluid introduced therein; substantially instantaneously plotting a line graphic record of the resulting pressure inside the vessel as a function of the volume of fluid so introduced into the vessel during the introduction of said fluid into the vessel and terminating the introduction of the fluid into the vessel when either the pressure in the vessel reaches a predetermined value or the slope in the progression of the single line deviates from linearity, in the event that the first occurrence is the slope of the line deviating from linearity indicating non-linearity elastic expansion of said vessel the improvement which comprises:

(a) determining the amount of fluid which would have been required to pressurize the vessel to the predetermined test pressure if it continued to expand elastically thereto;

(b) determining the amount of actual total expansion of the vessel at the predetermined test pressure if it had expanded elastically thereto;

(c) determining the amount of the total expansion which is equal to a predetermined permissible permanent expansion at said predetermined test pressure;

(d) plotting a reference line parallel to the linear portion of said single line a distance therefrom equal to the amount of permissible permanent expansion;

(e) introducing an additional amount of fluid into said vessel to increase the pressure above the pressure at which the introduction of the liquid was terminated, while continuing to print the line graphic record;

(f) terminating the introduction of the fluid into the vessel when the single line intersects the reference line; and (g) releasing the liquid from the vessel.

7. The method as defined in claim 6 wherein the test fluid is a liquid.

8. The method as defined in claim 6 wherein the maximum amount of permissible permanent expansion of a vessel subjected to the predetermined test pressure is about 10 percent of the total expansion of the vessel at said pressure.

9. The method as defined in claim 6 wherein the test fluid is water.

References Cited

UNITED STATES PATENTS

| | | | |
|---|---|---|---|
| 2,821,851 | 2/1958 | Daley | 73—37 |
| 3,057,185 | 10/1962 | Van Horne et al. | 73—37 |
| 3,230,760 | 1/1966 | Fryer, Jr. et al. | 73—37 |
| 3,344,656 | 10/1967 | Van Horne et al. | 73—37 |
| 3,383,905 | 5/1968 | Servos et al. | 73—37 |

S. CLEMENT SWISHER, Primary Examiner